No. 839,022. PATENTED DEC. 18, 1906.
C. McQUOWN.
ROTARY ENGINE.
APPLICATION FILED APR. 5, 1906.

5 SHEETS—SHEET 1.

WITNESSES:

INVENTOR
Charles McQuown
BY
ATTORNEYS

No. 839,022. PATENTED DEC. 18, 1906.
C. McQUOWN.
ROTARY ENGINE.
APPLICATION FILED APR. 5, 1906.
5 SHEETS—SHEET 2.
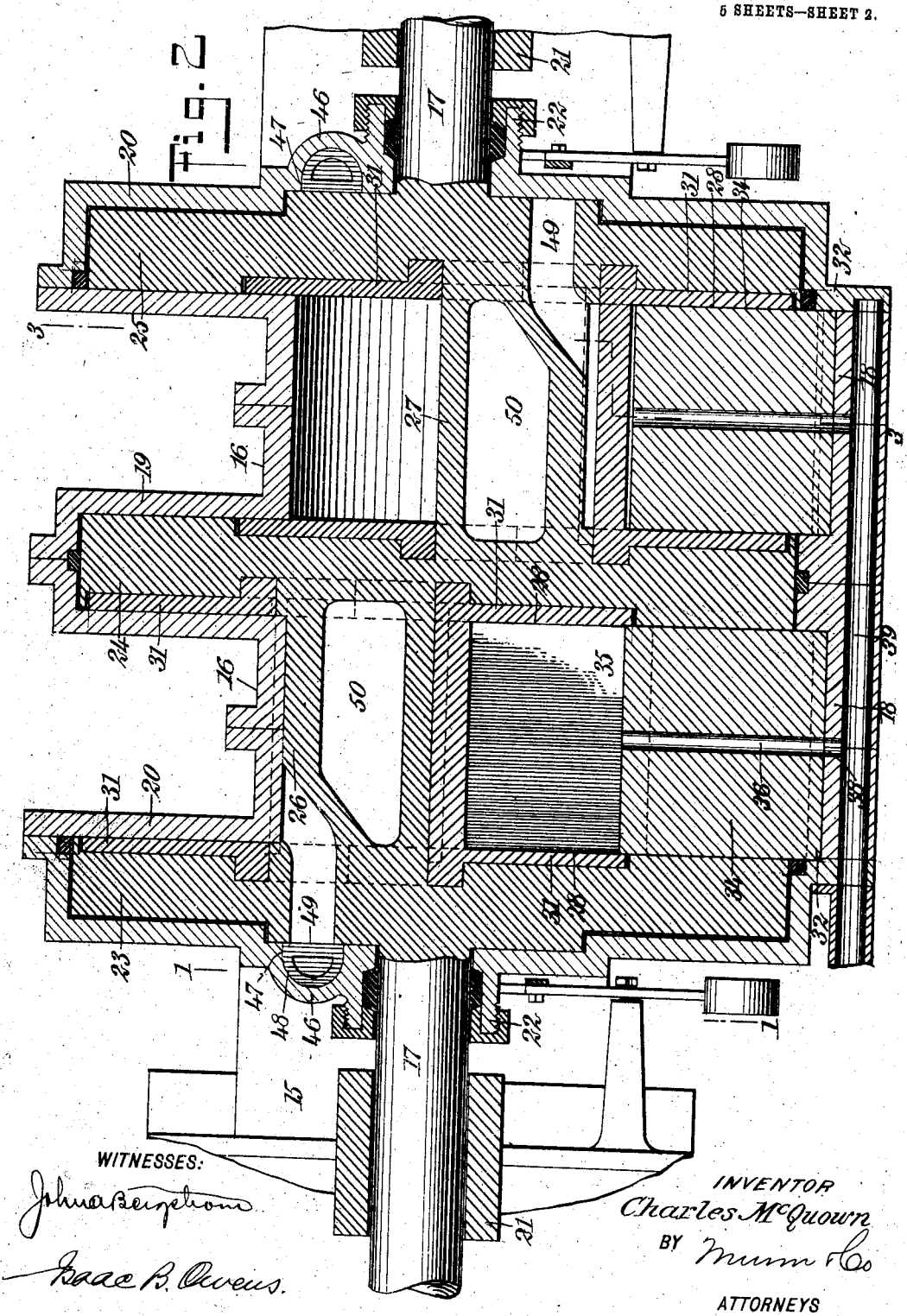
WITNESSES:
INVENTOR
Charles McQuown
BY Munn & Co
ATTORNEYS No. 839,022. PATENTED DEC. 18, 1906.
C. McQUOWN.
ROTARY ENGINE.
APPLICATION FILED APR. 5, 1906.
5 SHEETS—SHEET 3.
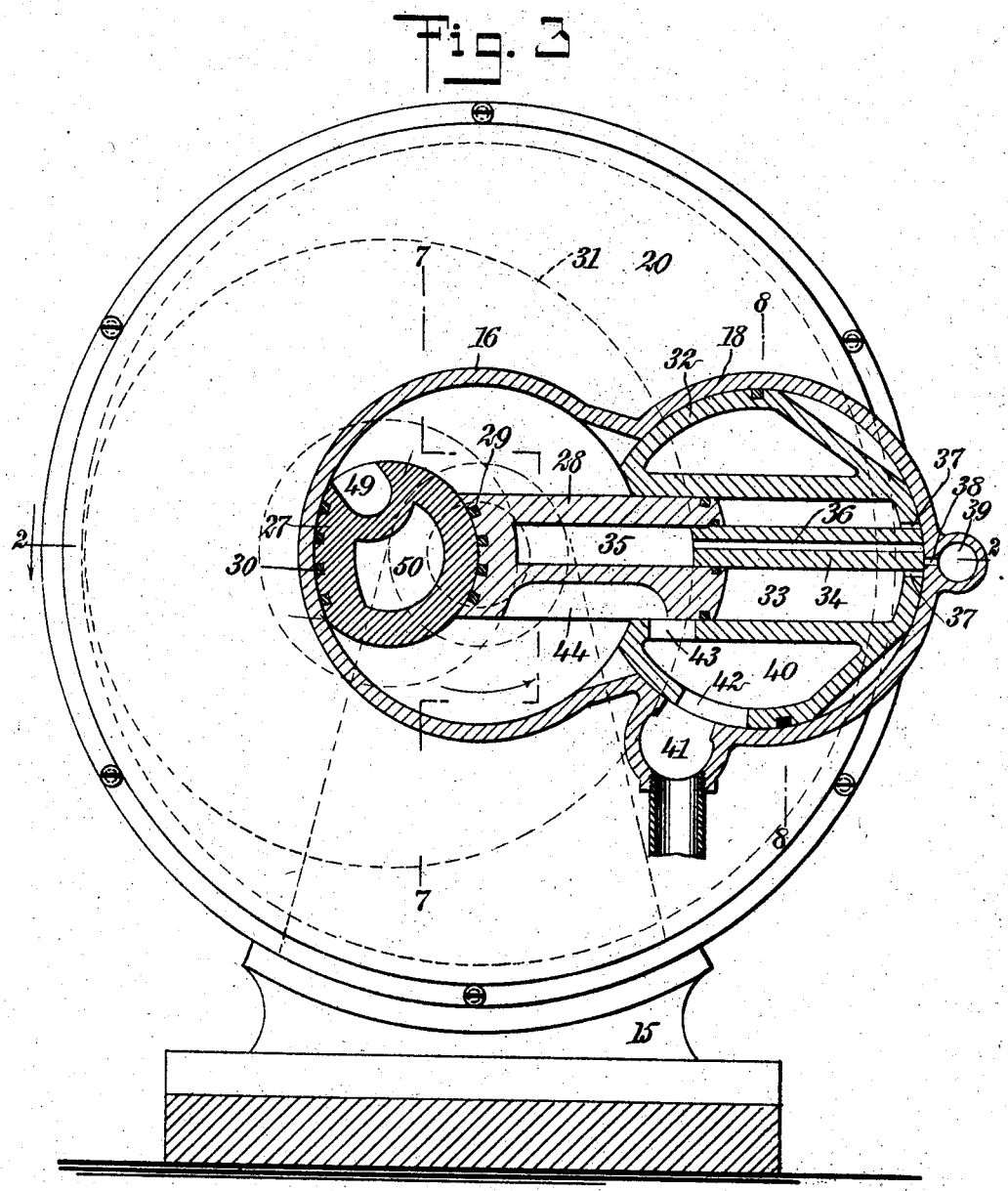
WITNESSES:
INVENTOR
Charles McQuown
BY
Munn & Co
ATTORNEYS No. 839,022. PATENTED DEC. 18, 1906.
C. McQUOWN.
ROTARY ENGINE.
APPLICATION FILED APR. 5, 1906.

6 SHEETS—SHEET 4.

WITNESSES:
John A. Bergstrom
Isaac B. Owens.

INVENTOR
Charles McQuown
BY Munn & Co
ATTORNEYS

No. 839,022. PATENTED DEC. 18, 1906.
C. McQUOWN.
ROTARY ENGINE.
APPLICATION FILED APR. 5, 1906.
5 SHEETS—SHEET 5.
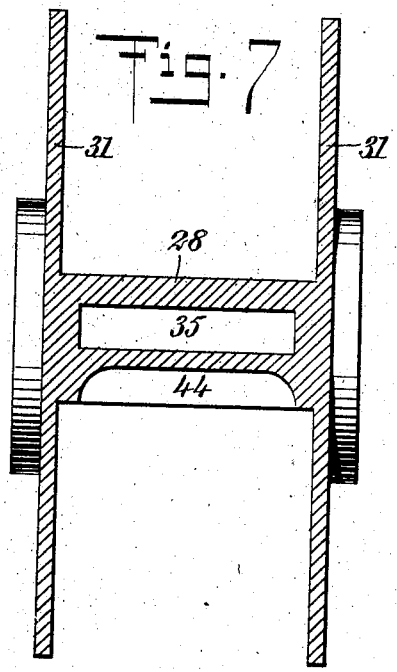
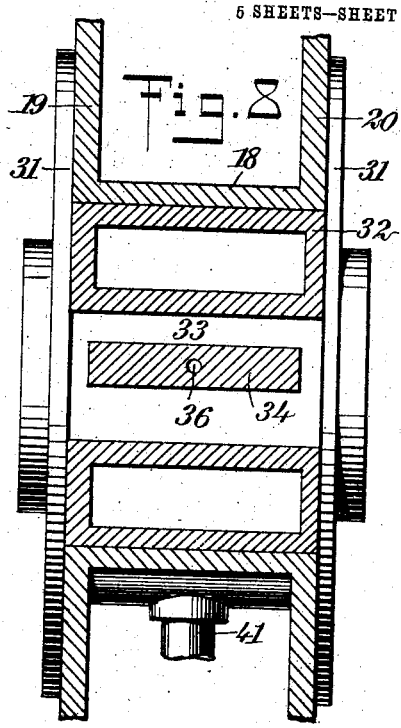
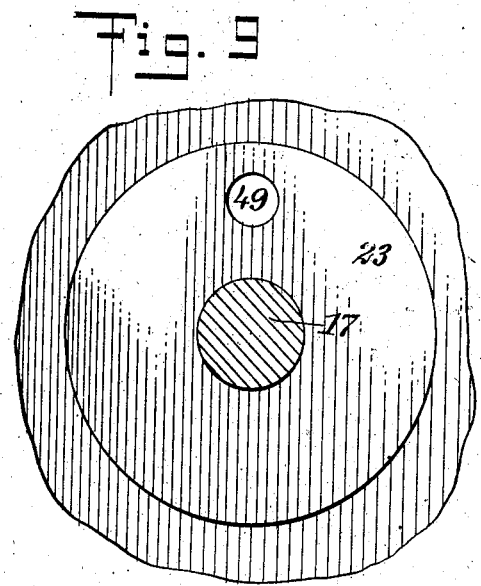
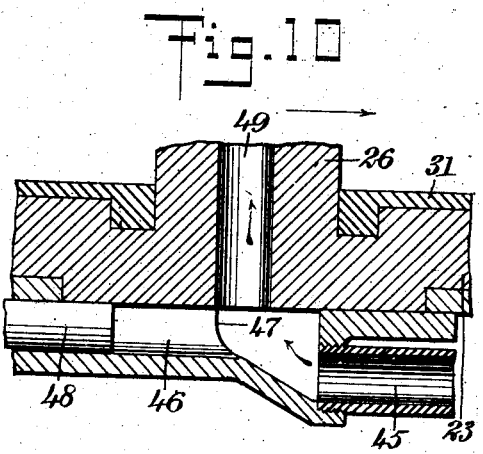
WITNESSES:
INVENTOR
Charles McQuown
BY Munn & Co
ATTORNEYS

UNITED STATES PATENT OFFICE.

CHARLES McQUOWN, OF GROVE CITY, OHIO.

ROTARY ENGINE.

No. 839,022.      Specification of Letters Patent.      Patented Dec. 18, 1906.

Application filed April 5, 1906. Serial No. 310,006.

*To all whom it may concern:*

Be it known that I, CHARLES McQUOWN, a citizen of the United States, and a resident of Grove City, in the county of Franklin and State of Ohio, have invented a new and Improved Rotary Engine, of which the following is a full, clear, and exact description.

The invention relates to a rotary engine in which a stator or stationary casing incloses a piston or rotating driving member, which is mounted on and eccentrically of the engine-shaft and arranged to be driven in the stator by the pressure of the steam, the movement and action of the steam being controlled by a peculiarly-arranged abutment having a combined circular and oscillating movement within a housing, which itself is held to rock in an extension of the main casing or stator. The engine may be constructed with any number of units or divisions; but it is preferably arranged embodied as with two units, the piston-surfaces of which are set at one hundred and eighty (180) degrees apart, so as to secure regularity of action.

The invention involves various other features of major or minor importance, and all will be fully set forth hereinafter, and particularly pointed out in the claims.

Reference is to be had to the accompanying drawings, which illustrate, as an example, the preferred embodiment of my invention.

Figure 1:
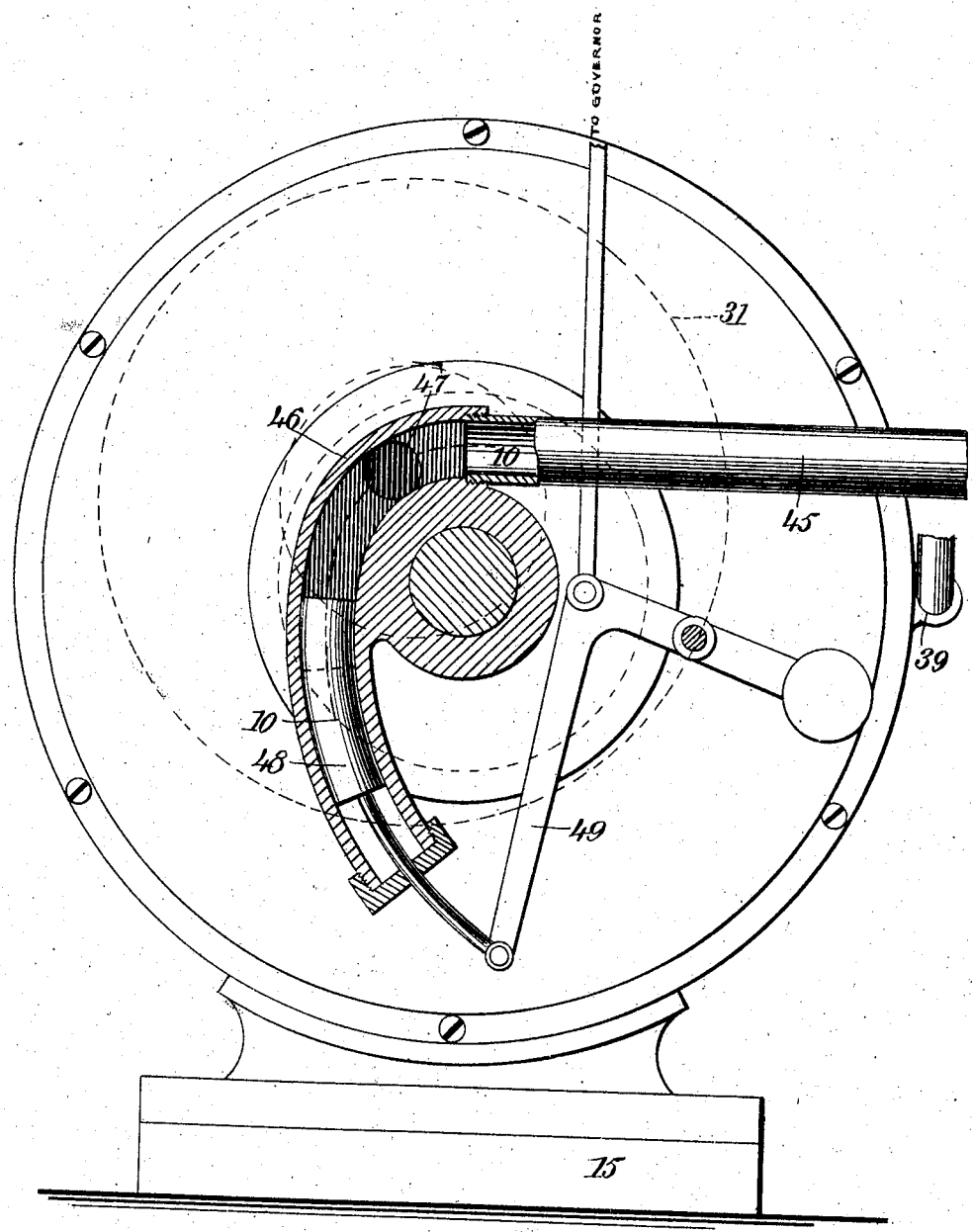
Figure 4:
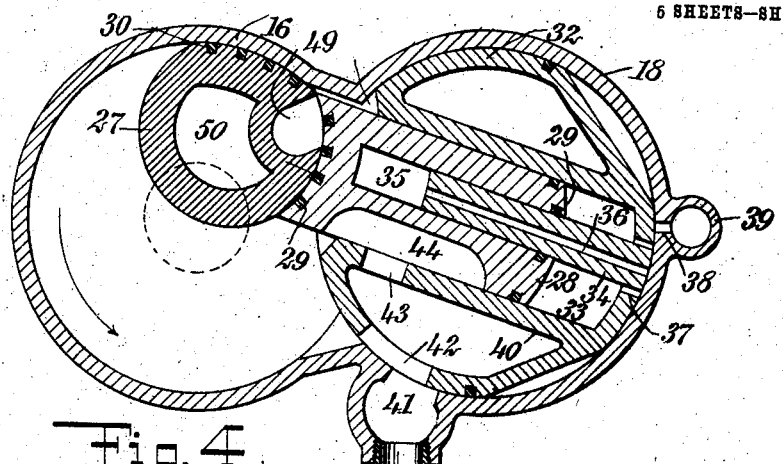
Figure 5:
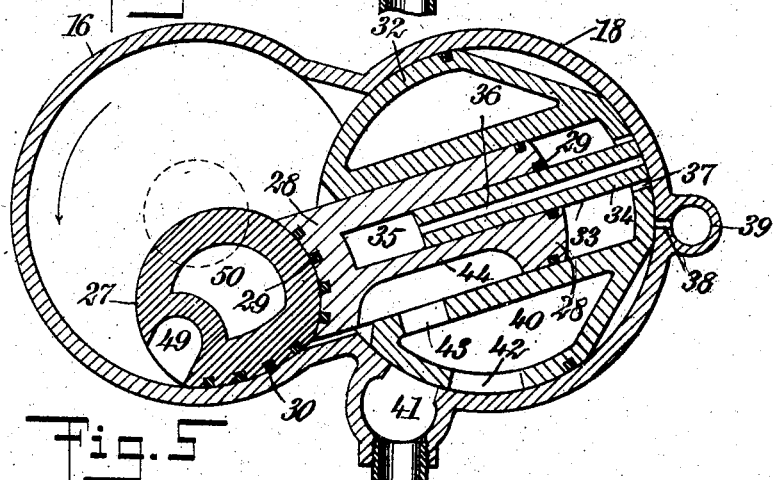
Figure 6:
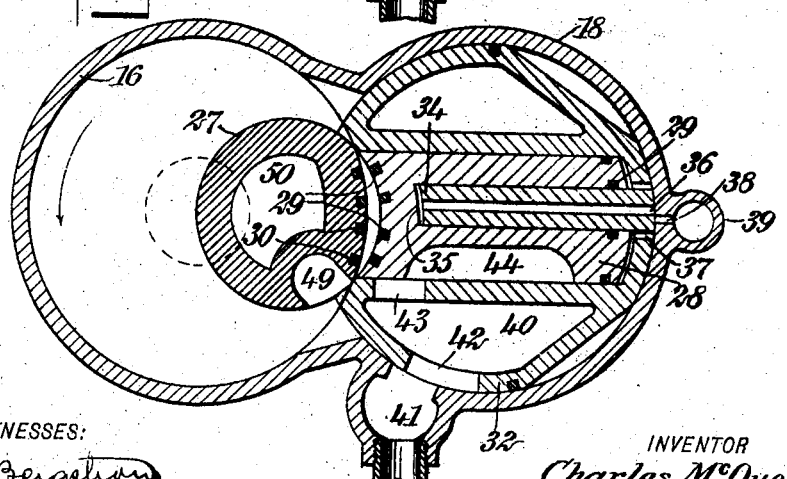

In the drawings, Figure 1 is an end elevation of the invention with parts in section on the line 1 1 of Fig. 2. Fig. 2 is a horizontal section through the engine on the line 2 2 of Fig. 3. Fig. 3 is a transverse section on the irregular line 3 3 of Fig. 2. Figs. 4, 5, and 6 are transverse sections through the working parts, essentially on the line 3 3 of Fig. 2, and showing said parts in three progressive positions. Fig. 7 is a detail section on the line 7 7 of Fig. 3. Fig. 8 is a detail section on the line 8 8 of Fig. 3. Fig. 9 is a fragmentary end elevation of the rotor, showing the driving-shaft in section. Fig. 10 is a detail section on the curved line 10 10 of Fig. 1, showing the arrangement for controlling the admission of steam to the engine; and Fig. 11 is a detail section of the packing.

The engine is mounted on a base 15. The stationary casing or stator which is sustained by the base is in practice constructed of a number of matching sections, as shown in Figs. 2 and 3, to facilitate the assemblage of the parts. In the type of engine here shown the stator comprises two circular working chambers 16, which are concentric to the engine-shaft 17. Each working chamber 16 is directly contiguous to and communicates with a laterally offset extension-chamber 18, the extension members 18 containing the abutment-housing, as will be hereinafter fully set forth. The pairs of working chambers 16 and extension-chambers 18 are separated from each other by means of an enlarged circular chamber 19, and at each end of the engine similar enlarged circular chambers 20 are arranged. All of these parts, 16, 18, 19, and 20, are combined in one rigid structure suitably fastened on the base 15. The engine-shaft 17 is mounted in boxes 21 also sustained on the base, and each end wall of the engine is provided with a stuffing-box gland 22, through which the shaft passes.

The rotor is carried by and forms a rigid part with the engine-shaft and is made up of three disks 23, 24, and 25, turning true in the respective chambers 20, 19, and 20 and rigidly connected to each other by means of crank or eccentric pistons 26 and 27, the cranked pistons 26 and 27 being set at one hundred and eighty (180) degrees from each other and arranged to sweep through the respective chambers 16, while the end disks 23 and 25 are directly contiguous and fastened to the sections of the shaft 17. From the foregoing it will appear that the disks 23, 24, and 25 are, as the chambers 20, 19, and 20, concentric to the main shaft and in the operation of the engine turn around the center thereof.

The abutments 28 are adapted to have combined oscillating and circular movement in the respective working chambers 16 and coact with the respective cranked pistons 26 and 27, suitable packing 29 being applied to the working faces of the abutments to effect steam-tight connection with the pistons. The pistons are provided with similar packing 30, effecting steam-tight connection with the inner walls of the working chambers 16. The said abutments 28 are fastened to and formed, preferably, integral with disks 31. These disks are two for each abutment, lying one at each side, and they are formed with central orifices which loosely, yet snugly, surround the corresponding pistons 26 and 27. Said disks 31 are smaller than the disks 23, 24, and 25 and are arranged to run with an eccentric motion in the chambers 20, 19, and 20. As shown in Fig. 2, the disks 31 of the left-hand abutment 28 run the one in the left-hand chamber 20 at the left-hand side of the disk 23 and the other in the chamber 19 at the right-hand side of the disk 24, while the disks 31 of the right-hand abutment run the one in the chamber 19 at the left-hand side of the disk 24 and the other in the right-hand chamber 20 at the right-hand side of the disk 25. Owing to the opposite location of the pistons 26 and 27, the pairs of disks 31, related to the abutments 28, as well as the abutments themselves, are disposed oppositely in the engine, as Fig. 2 clearly illustrates. Therefore upon the movement of the rotor the disks 31 are given a planetary movement in their respective chambers around the center of the shaft 17, this movement imparting to the abutments 28 a combined radial or sliding and a sidewise or oscillatory movement, causing the abutments to maintain true engagement with their respective pistons at all times.

As shown in Figs. 2, 4, 5, and 6, the abutment-housings 32 are circular in general form and are fitted to oscillate freely in the respective abutment-housing chambers 18. Said housings are formed with cavities 33, (see Fig. 8,) in which the abutments are slidably received. They are also provided with walls 34, located in the cavities and fitted slidably in corresponding cavities 35, formed in the abutments. Said walls 34 are provided with vent-passages 36 to prevent compression in the cavities 35, and the outer walls of the cavities 33 have vent-orifices 37 to prevent compression in the second-named cavities. All of these vents communicate by passages 38 with a vent-pipe 39, which runs horizontally along the side of the engine and opens into the atmosphere. The abutment-housings are further provided with exhaust-cavities 40, which communicate with the exhaust-passages 41 by ports 42 and which communicate with the working chambers 16 by ports 43, the abutments having ported grooves 44 in their sides, which register with the ports 43 and forming passages leading thereto, permitting the exhaust of the steam from one side of the abutment and piston, while the live or expanding steam is acting on the other side. To each end of the engine a steam-pipe 45 leads. These pipes communicate with curved steam-chambers 46 at each end of the engine and formed in the walls of the stator. From the chambers 46 steam-ports 47 pass to the interior of the stator, and these steam-ports are adapted to be controlled by arc-shaped slide-valves 48, operating in the chambers 46 to throttle the steam movement through the ports. The valves 48 are connected to a linkage 49, which is intended to be under the control of the governor or otherwise to regulate the speed of the engine. Each cranked piston 26 and 27 is provided with a steam-port 49, and these ports during the movement of the rotor are designed to run into registry with the ports 47, thus receiving live steam therefrom during the time that said ports are in registry. The steam-ports 49 of the pistons pass inward longitudinally thereof and thence outward to the side walls of the piston, so that the steam issuing from said ports may enter the working chambers 16 to exert its motive influence on the pistons. For the purpose of lightening the engine the pistons may be formed with blind cavities 50, if desired.

In the operation of the engine steam is admitted to the chambers 48 and initial movement is given to the shaft 17 and its connections. As the ports 49 run into registry with the ports 47 live steam is admitted to the former ports, and immediately after the ports leave the position shown in Fig. 4 this steam enters the working chamber, exerting a driving influence on the piston and causing the parts to run in the direction of the arrow indicated in Fig. 4, assuming successively the positions shown in Figs. 3, 5, and 6, after which the parts continuing from the position shown in Fig. 6 reassume that shown in Fig. 4, and the cycle of operations is completed. Meanwhile as the steam is acting on one side of the piston when the parts reach the position shown in Figs. 4 and 3 the port-groove 44 establishes communication between the exhaust side of the working chamber and the port 43 and the spent steam is exhausted through the chamber 40 and ports 42 and 41. During these operations the rotor-disks 23, 24, and 25 run concentrically to the main shaft in their respective disk-chambers, while the abutment-disks 31, moving in unison with the abutments, run eccentrically to the main shaft or with a planetary movement also in the said disk-chambers. The operation of the engine is at all times under complete control through the medium of the valves 48 and their operating-gear.

I prefer to employ in the engine packing of the form illustrated in Fig. 11, which comprises two angular sections $a$, matching to give the packing a rectangular cross-sectional form, as the figure shows. Within the space $b$ in the packing-strip thus formed are arranged two members $c$ of wedge-shape form, between which a spring or springs $d$ act, the springs pressing the members $c$ against the sections $a$ and causing the same to spread, thus maintaining the sections firmly in engagement with the surfaces to which the packing is applied.

Having thus described the preferred form of my invention, what I actually claim, and desire to secure by Letters Patent, is—

1. A rotary engine having a stationary working chamber, an eccentric piston operating therein, an abutment bearing on the piston, an abutment-chamber juxtaposed to the working chamber, a rocking abutment-housing in which the abutment is slidably carried, the abutment having a curved end wall snugly engaging the side of the piston, and packing devices acting between the abutment and the piston at said end wall of the abutment.

2. In a rotary engine, the combination of a working chamber, an eccentric piston operating therein, an abutment-chamber juxtaposed to the working chamber, a rocking abutment-housing located in the abutment, and a rocking and sliding abutment carried in the housing and engaging the piston, said abutment and housing having ports therein to accommodate the movement of the exhaust-steam.

3. A rotary engine having a circular working chamber, an abutment-housing chamber juxtaposed thereto, an eccentric piston arranged to move through the working chamber, an abutment-housing arranged to rock in the abutment-housing chamber, an abutment engaging the piston and arranged to slide in the housing, and means connecting the abutment with the piston to maintain the two in engagement, said means connecting the abutment and piston comprising disks arranged one at each side of the working chamber and mounted loosely on the end portions of the piston.

4. A rotary engine having a stator comprising a circular working chamber, an enlarged disk-chamber at each end thereof and concentric thereto, and an abutment-housing chamber located at one side of the working chamber between the disk-chambers, a main or engine shaft, a cranked piston connected thereto and operating in the working chamber, rotor-disks attached to the engine-shaft and running concentrically in the disk-chamber, an abutment engaging the piston, an abutment-housing slidably receiving the abutment and rockably mounted in the abutment-housing casing, and means connecting the abutment with the piston to maintain the two in engagement with each other.

5. A rotary engine having a stator comprising a circular working chamber, an enlarged disk-chamber at each end thereof and concentric thereto, and an abutment-housing chamber located at one side of the working chamber between the disk-chambers, a main or engine shaft, a cranked piston connected thereto and operating in the working chamber, rotor-disks attached to the engine-shaft and running concentrically in the disk-chamber, an abutment engaging the piston, an abutment-housing slidably receiving the abutment and rockably mounted in the abutment-housing casing, and means connecting the abutment with the piston to maintain the two in engagement with each other, said means connecting the piston and abutment comprising abutment-disks attached to opposite edges of the abutment and mounted loosely on the ends of the piston, the abutment-disks running eccentrically in the disk-chambers alongside of the rotor-disks.

6. A rotary engine having a circular working chamber, an abutment-housing chamber juxtaposed thereto, an eccentric piston arranged to move through the working chamber, an abutment-housing arranged to rock in the abutment-housing chamber, an abutment engaging the piston and arranged to slide in the housing, and means connecting the abutment with the piston to maintain the two in engagement, the piston having a port for admitting the motive agent on one side of the abutment, and the abutment and housing having means for exhausting the motive agent from the other side of the abutment.

7. A rotary engine having a circular working chamber, an abutment-housing chamber juxtaposed thereto, an eccentric piston arranged to move through the working chamber, an abutment-housing arranged to rock in the abutment-housing chamber, an abutment engaging the piston and arranged to slide in the housing, and means connecting the abutment with the piston to maintain the two in engagement, the abutment having a cavity therein and the housing having an interior wall slidably fitted in the cavity of the abutment.

8. A rotary engine having a circular working chamber, an abutment-housing chamber juxtaposed thereto, an eccentric piston arranged to move through the working chamber, an abutment-housing arranged to rock in the abutment-housing chamber, an abutment engaging the piston and arranged to slide in the housing, and means connecting the abutment with the piston to maintain the two in engagement, the abutment having a cavity therein and the housing having an interior wall slidably fitted in the cavity of the abutment, and the engine having vent-ports for preventing compression in the housing and abutment-cavity.

In testimony whereof I have signed my name to this specification in the presence of two subscribing witnesses.

CHARLES McQUOWN.

Witnesses:
S. E. JOHNSTON,
G. C. KELLER.